United States Patent
Stein et al.

(10) Patent No.: US 11,993,272 B2
(45) Date of Patent: May 28, 2024

(54) DRIVING ASSISTANCE METHOD FOR A VEHICLE, CONTROL UNIT, DRIVING ASSISTANCE SYSTEM, AND VEHICLE

(71) Applicant: Robert Bosch GmbH, Stuttgart (DE)

(72) Inventors: Fabian Stein, Sindelfingen (DE); Alfred Peschka, Budapest (HU)

(73) Assignee: ROBERT BOSCH GMBH, Stuttgart (DE)

(*) Notice: Subject to any disclaimer, the term of this patent is extended or adjusted under 35 U.S.C. 154(b) by 297 days.

(21) Appl. No.: 17/055,409

(22) PCT Filed: Aug. 9, 2019

(86) PCT No.: PCT/EP2019/071414
§ 371 (c)(1),
(2) Date: Nov. 13, 2020

(87) PCT Pub. No.: WO2020/035408
PCT Pub. Date: Feb. 20, 2020

(65) Prior Publication Data
US 2021/0114602 A1    Apr. 22, 2021

(30) Foreign Application Priority Data
Aug. 17, 2018   (DE) .................... 10 2018 213 931.8

(51) Int. Cl.
*B60W 50/00*       (2006.01)
*B60W 40/105*     (2012.01)
(Continued)

(52) U.S. Cl.
CPC .......... *B60W 50/00* (2013.01); *B60W 40/105* (2013.01); *B60W 40/107* (2013.01);
(Continued)

(58) Field of Classification Search
CPC .. B60W 50/00; B60W 40/105; B60W 40/107; B60W 40/109; B60W 40/114;
(Continued)

(56) References Cited

U.S. PATENT DOCUMENTS

2005/0002558 A1\* 1/2005 Franke ...................... B60R 1/00
382/154
2011/0066322 A1\* 3/2011 Karlsson ............. G01G 19/086
701/33.4
(Continued)

FOREIGN PATENT DOCUMENTS

CN    104512412 A    4/2015
CN    105579320 A    5/2016
(Continued)

OTHER PUBLICATIONS

NPL published by arxiv.org on 2011; title "The Moore-Penrose pseudoinverse A tutorial review of the theory" by ("Barata"). (Year: 2011).\*

(Continued)

*Primary Examiner* — Sohana Tanju Khayer
(74) *Attorney, Agent, or Firm* — NORTON ROSE FULBRIGHT US LLP; Gerard A. Messina

(57) ABSTRACT

A driving assistance method for a vehicle. An instantaneous speed of the vehicle and an instantaneous yaw rate of the vehicle are ascertained. An operation of self-locating of the vehicle is carried out on the basis of the ascertained, instantaneous speed and the ascertained, instantaneous yaw rate of the vehicle. To that end, an instantaneous circumferential wheel speed of one or more wheels of the vehicle is directly measured, evaluated and taken as a basis of the determination of the instantaneous speed and the instantaneous yaw rate of the vehicle.

9 Claims, 7 Drawing Sheets

(51) Int. Cl.
*B60W 40/107* (2012.01)
*B60W 40/109* (2012.01)
*B60W 40/114* (2012.01)

(52) U.S. Cl.
CPC ........ *B60W 40/109* (2013.01); *B60W 40/114* (2013.01); *B60W 2050/0033* (2013.01); *B60W 2050/0052* (2013.01); *B60W 2520/10* (2013.01); *B60W 2520/105* (2013.01); *B60W 2520/12* (2013.01); *B60W 2520/125* (2013.01); *B60W 2520/14* (2013.01); *B60W 2520/28* (2013.01); *B60W 2720/10* (2013.01); *B60W 2720/14* (2013.01)

(58) Field of Classification Search
CPC . B60W 2050/0033; B60W 2050/0052; B60W 2520/10; B60W 2520/105; B60W 2520/12; B60W 2520/125; B60W 2520/14; B60W 2520/28; B60W 2720/10; B60W 2720/14; B62D 15/0285; G01C 21/12; G01C 22/00; G01S 19/39; G01S 19/396; G01S 19/41
See application file for complete search history.

(56) References Cited

U.S. PATENT DOCUMENTS

| | | | |
|---|---|---|---|
| 2011/0118979 A1* | 5/2011 | Mao | G01C 21/165 |
| | | | 701/532 |
| 2015/0298689 A1 | 10/2015 | Schwartz et al. | |
| 2016/0282226 A1* | 9/2016 | Lavoie | B60C 99/00 |
| 2016/0332626 A1* | 11/2016 | Katsuyama | B60L 15/34 |
| 2016/0366815 A1* | 12/2016 | Guyette | G01C 21/165 |
| 2017/0261326 A1* | 9/2017 | Mizutani | G01P 21/02 |
| 2018/0086336 A1* | 3/2018 | Jones | B60W 30/09 |
| 2018/0178767 A1 | 6/2018 | Chanda | |
| 2018/0217595 A1* | 8/2018 | Kwon | G06N 5/02 |
| 2019/0001757 A1* | 1/2019 | Singh | B60C 23/0415 |
| 2019/0293432 A1* | 9/2019 | Demiral | G07C 5/085 |
| 2020/0018596 A1* | 1/2020 | Hinz | B60C 23/061 |
| 2020/0059886 A1* | 2/2020 | Yu | H04B 17/318 |
| 2021/0261143 A1* | 8/2021 | Lapis | B60T 8/172 |

FOREIGN PATENT DOCUMENTS

| | | |
|---|---|---|
| CN | 108216219 A | 6/2018 |
| DE | 102016005739 A1 | 1/2017 |
| DE | 102017007773 A1 | 4/2018 |
| DE | 112015007005 T5 | 6/2018 |
| EP | 2030852 B1 | 7/2010 |

OTHER PUBLICATIONS

M. Bak et al: "Location estimation using delayed measurments". Advanced Motion Control, 1998. AMC '98-Coimbra., 1998 5th International L Workshop on Coimbra, Portugal Jun. 29-Jul. 1, 1998, Jan. 1, 1998, pp. 180-185. Retrieved from the Internet on Nov. 11, 2020: https://www.researchgate.net/publication/3783879_Location_estimation_using_delayed_measurements.

Kichun Jo et al: "Distributed vehicle state estimation system using information fusion of GPS and in-vehicle sensors for vehicle localization", Intelligent Transportation Systems (ITSC), 2011 14th International IEEE Conference on, IEEE, Oct. 5, 2011. pp. 2009-2014.

Christopher R. Carison, "Estimation with applications for automobile dead reckoning and control", Jan. 1, 2004, 137 Pages.

International Search Report for PCT/EP2019/071414, dated Dec. 3, 2019.

* cited by examiner

DRIVING ASSISTANCE METHOD FOR A VEHICLE, CONTROL UNIT, DRIVING ASSISTANCE SYSTEM, AND VEHICLE

FIELD

The present invention relates to a driving assistance method for a vehicle, a control unit for a driving assistance system of a vehicle, and a driving assistance system, as well as a vehicle, as such.

BACKGROUND INFORMATION

Driving assistance methods and systems for vehicles enjoy increasing popularity. An important aspect of such methods and systems is the ability of the vehicle to self-locate, for example, with regard to positioning and orientation of the vehicle with respect to a roadway, surrounding objects, the surrounding traffic, and, in particular, with respect to a parking space or the like.

In conventional systems and methods, signals of so-called wheel impulse counters (WIC's) are used due to the real-time demands of such driving assistance methods and systems. However, in the low-speed range, for example, while parking at less than 5 km/h, these supplied values often have insufficient measuring accuracy.

SUMMARY

A driving assistance method in accordance with an example embodiment of the present invention may have the advantage that measured values having sufficient measurement accuracy for the self-locating of a base vehicle are also supplied in the low-speed range. According to an example embodiment of the present invention, this is achieved by in that a driving assistance method for a vehicle is provided, where (i) an instantaneous speed of the vehicle and an instantaneous yaw rate of the vehicle are ascertained; and where (ii) an operation of self-locating of the vehicle is carried out on the basis of the ascertained instantaneous speed and the ascertained instantaneous yaw rate of the vehicle; to that end, an instantaneous circumferential wheel speed of one or more wheels of the vehicle being directly measured, evaluated and taken as a basis of the determination of the instantaneous speed and the instantaneous yaw rate of the vehicle. The measurement of the circumferential wheel speed of one or more wheels may be accomplished at a higher measurement accuracy than the measured values of wheel impulse counters normally used. Due to this, the present invention also produces, all in all, a higher accuracy in the case of the self-locating of the base vehicle.

Preferred further refinements of the present invention are described herein.

In one preferred specific embodiment of the driving assistance method of the present invention, a specific, instantaneous circumferential wheel speed is measured and supplied by a circumferential wheel speed sensor.

It is particularly advantageous if, in a specific embodiment of the driving assistance method of the present invention, a time delay of a measured, instantaneous circumferential wheel speed is compensated for by temporally extrapolating measured values at an earlier measuring time to a current evaluation time. Using this measure, the relevance to the present of, or the presence of, the measurement data, which is not always adequate in the case of many circumferential wheel speed sensors, due to a time delay, may be compensated for, which means that advantages of a real-time application preferably ensue.

A particularly simple embodiment of the compensation may be arrived at, if it is implemented (i) by integrating with respect to time, from the earlier measuring time to the current evaluation time, (ii) on the basis of one or more measured values regarding an instantaneous acceleration of the vehicle and/or on the basis of a single-track model of the vehicle.

In another advantageous exemplary embodiment of the driving assistance method according to the present invention, a particularly advantageous and rapid capability of executing the individual processing steps is yielded, if, during the determination of the instantaneous speed and the instantaneous yaw rate of the vehicle, an operation of Moore pseudoinversion is made available and applied to the ascertained circumferential wheel speeds. Through these intended measures, a relationship between different variables, which describe the state of the vehicle, is utilized in an elegant and, simultaneously, reliable manner, namely, the relationship between, on one hand, the instantaneous speed and the instantaneous yaw rate of the vehicle, which are to be determined, and the measurable values of the circumferential wheel speed.

This may be accomplished, in particular, in that during and for the determination of the instantaneous speed and the instantaneous yaw rate of the vehicle, a Moore pseudoinverse of a transformation matrix between a state of the base vehicle and a vector formed by the individual, ascertained circumferential wheel speeds is generated and applied to the vector formed by the individual, ascertained circumferential wheel speeds, in order to provide the instantaneous speed and the instantaneous yaw rate of the vehicle. In this context, in particular, the state of the vehicle describes the instantaneous speed and the instantaneous yaw rate of the vehicle. Optionally, the path length traveled by a wheel contact point, which may also be referred to as instantaneous path length traveled by a wheel contact point, may also be taken into account for one or more wheels of the vehicle.

An advantage of the Moore pseudoinverse is its analytically specifiable representation and structure, as well as its property of being able to inherently minimize or optimize a basic norm without numerical methods or iteration.

A particularly high degree of accuracy in self-locating may be attained, if, in accordance with another advantageous further refinement of the driving assistance method of the present invention, in addition to the circumferential wheel speed, an instantaneous distance traveled by the contact point of one or more wheels of the vehicle is measured, evaluated and taken as a basis for the determination of the instantaneous speed, the instantaneous yaw rate, an instantaneous position, and/or an instantaneous orientation of the vehicle.

In this context, a specific, instantaneous distance traveled by a respective contact point of a wheel of the vehicle may be measured and made available via a respective wheel impulse counter, in view of a supplied value of the circumference of the wheel. Thus, due to this measure, measured values already supplied in an ESP system may be used by the present invention.

In this context, the accuracy may increase further, if, in accordance with another advantageous embodiment of the driving assistance method of the present invention, a specific, measured, instantaneous circumferential wheel speed of one or more wheels of the vehicle and a specific, measured, instantaneous distance traveled by the contact point of one or more wheels of the vehicle are supplied to a Bayes filter and, in particular, to an extended Kalman filter, for evaluation, in order to determine and/or check an instantaneous position and/or instantaneous orientation of the vehicle for plausibility.

According to a further aspect of the present invention, a control unit for a driving assistance system of a vehicle is provided; the control unit being configured to initiate, execute, control and/or regulate a driving assistance method of the present invention.

In addition, the subject matter of the present invention also includes a driving assistance system for a vehicle, as such; the driving assistance system being configured to initiate, execute, control and/or regulate a driving assistance method of the present invention; and/or the driving assistance system including a control unit configured according to the present invention or having an operative connection to such a control unit configured according to the present invention.

The driving assistance method of the present invention and the driving assistance system of the present invention may be understood and implemented purely by hardware, e.g., as a device for controlling the operation of a vehicle, as well.

For example, an implementation as an ASIC is possible. As an alternative to that, a purely process-engineering implementation, for example, in connection with a computer implementation of the driving assistance method and driving assistance system of the present invention, is conceivable, preferably, in connection with, or as, a method for controlling the operation of a vehicle. Combined or mixed systems, in which partial aspects of the present invention are implemented by hardware and/or by software or process engineering, are also conceivable.

In addition, the present invention also provides a vehicle, as such. The vehicle of the present invention is configured to be used by a driving assistance method developed in accordance with the present invention. Alternatively, or in addition, the proposed vehicle is configured with a driving assistance system according to the present invention.

BRIEF DESCRIPTION OF THE DRAWINGS

Specific embodiments of the present invention are described in detail with reference to the figures.

DETAILED DESCRIPTION OF EXAMPLE EMBODIMENTS

Figure 1:
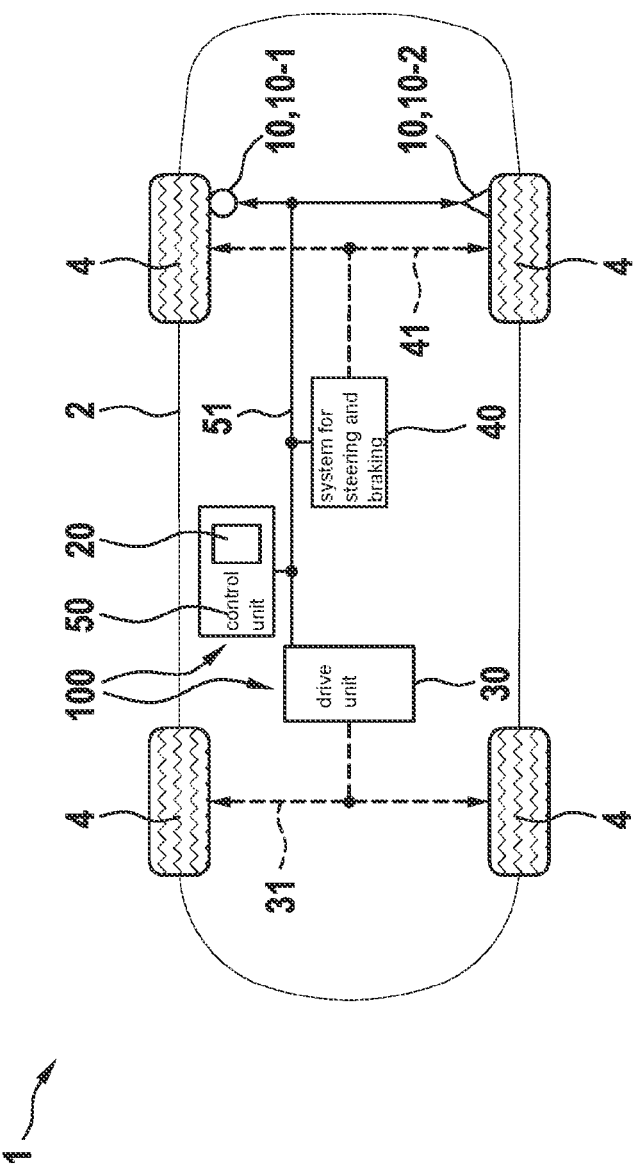
FIG. 1 shows, in the form of a schematic block diagram, a vehicle, which is configured according to the present invention, and in which a specific embodiment of the driving assistance method of the present invention is used.

Below, exemplary embodiments of the present invention and the technical background are described in detail with reference to FIGS. 1 through 7. Identical and equivalent elements and components, as well as elements and components functioning in the same or in an equivalent manner, are denoted by the same reference numerals. The detailed description of the denoted elements and components is not repeated in each case of their appearance.

The depicted features and further characteristics may be isolated from each other and combined with each other as desired, without departing from the essence of the present invention.

FIG. 1 shows, in the form of a schematic block diagram, a vehicle 1, which is configured according to the present invention and utilizes a specific embodiment of the driving assistance system 100 of the present invention and/or a specific embodiment of the driving assistance method T according to the present invention.

The vehicle 1 according to the present invention is shown schematically, including a body 2, wheels 4, a drive unit 30 having a drive train 31, and a system 40 for steering and braking that possesses a steering and/or brake train 41.

In addition, a control unit 50 for the underlying driving assistance system 100 of the present invention is provided; for example, the control unit also being able to take the form of a part of a vehicle or engine control unit and setting up a connection to drive unit 30 and system 40 for braking and steering, via a control and/or acquisition line 51.

Via control and/or acquisition line 51, control unit 50 is also connected to sensors 10, namely, a first sensor 10-1 in the form of a sensor for the circumferential wheel speed and a second sensor 10-2 in the form of a wheel impulse counter.

During operation of vehicle 1, measuring signals with regard to the circumferential wheel speed and/or with regard to the wheel speed or with regard to the angle of rotation of the wheel, are supplied to control unit 50 via corresponding sensors 10, 10-1, 10-2, and are subjected to further processing and analysis, using a Bayes filter and, in particular, a Kalman filter 20, in order to generate and supply, on one hand, values for vehicle speed v and for yaw rate $\omega$ and, on the other hand, values of the distance traveled S by the specific contact point of a wheel 4, and to provide, from them, a position and/or an orientation of vehicle 1 in the surrounding area with a high degree of reliability, even at low speeds of vehicle 1.

Figure 2:
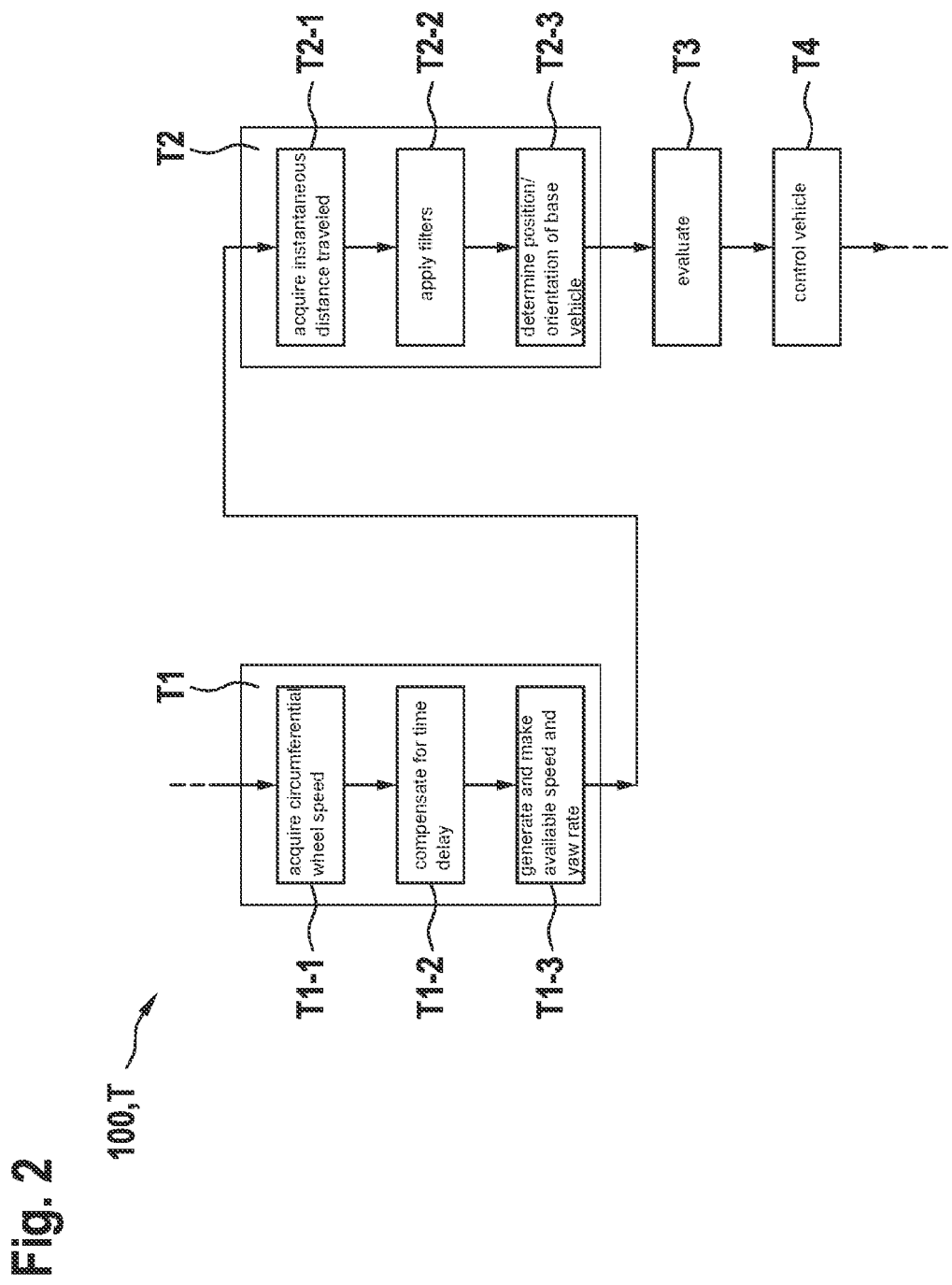
FIG. 2 shows a flow chart of a specific embodiment of a driving assistance system according to the present invention, in the form of a driving assistance method.
Figure 3:
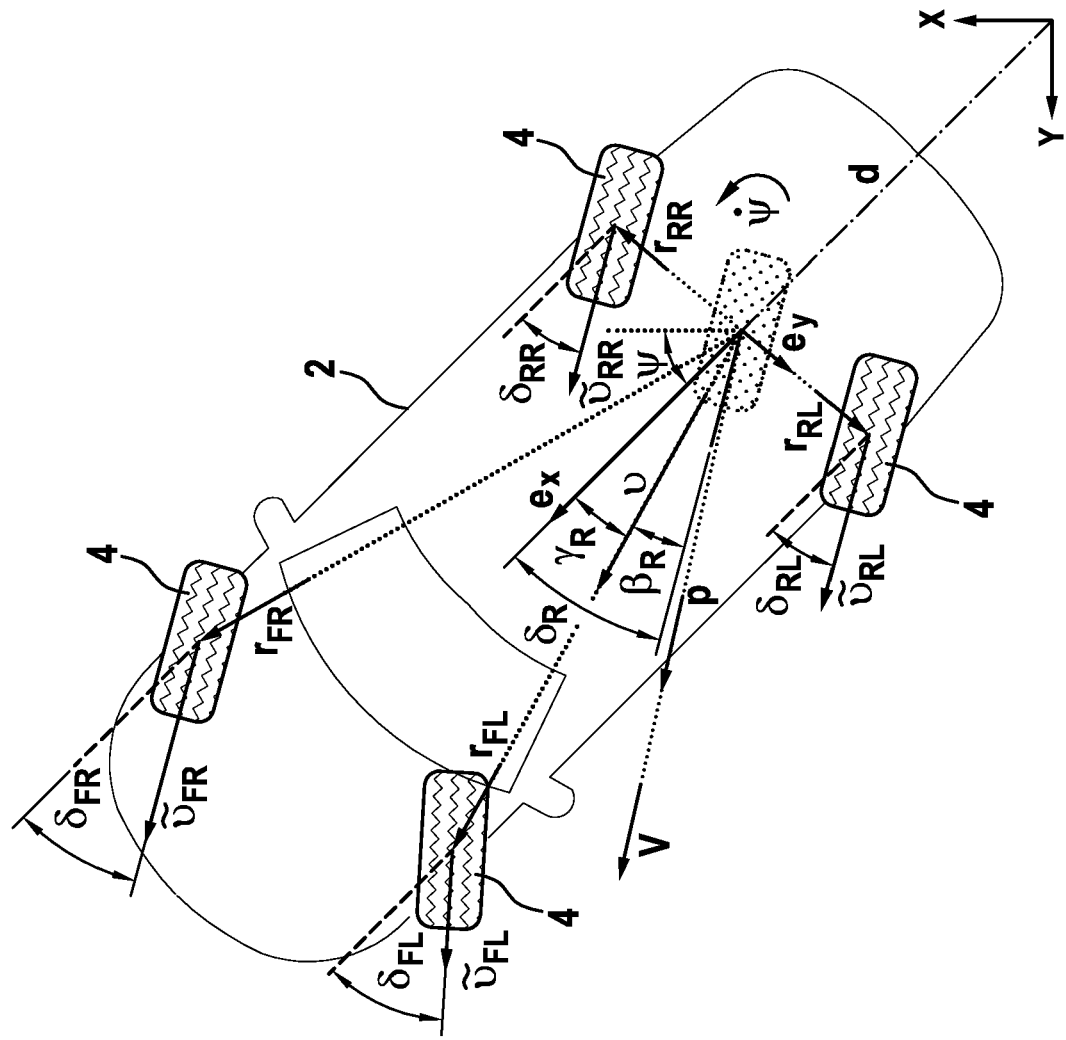
FIG. 3 explains, in a schematic manner, different parameters used in a specific embodiment of the driving assistance system or driving assistance method of the present invention, with regard to the state of a base vehicle.

FIG. 2 shows a flow chart of a specific embodiment of a driving assistance system 100 according to the present invention, taking the form of a driving assistance method T.

According to the essence, the specific embodiment of driving assistance method T of the present invention shown in FIG. 2 is subdivided into (i) a step T1 for ascertaining speed v and yaw rate $\omega$ of a vehicle 1; (ii) a step T2 of self-locating of vehicle 1 on the basis of supplied measured values and/or data derived from them; (iii) a step T3 of monitoring and evaluating the surrounding area of the vehicle; as well as (iv) a step T4 of controlling a vehicle unit on the basis of the self-locating and the evaluation of the surrounding area of the vehicle.

Step T1 of ascertaining speed v and yaw rate $\omega$ of vehicle 1 is subdivided into a series of substeps T1-1 to T1-3.

In first substep T1-1, circumferential wheel speed V is acquired with regard to one or more wheels 4, in particular, through direct measurement by a corresponding sensor 10-1 for the circumferential wheel speed V of an associated wheel 4.

In second substep T1-2, a time delay possibly occurring during the acquisition of circumferential wheel speed V is compensated for, for example, by temporal extrapolation into the future with the aid of integration with respect to time, as is explained below in detail in connection with a preferred specific embodiment of the present invention.

Finally, in third substep T1-3, speed v and yaw rate ω of base vehicle 1 are generated and made available.

In one specific embodiment of the present invention, step T2 of the self-locating of vehicle 1 may also be subdivided into a series of substeps T2-1 to T2-3.

In a first substep T2-1, instantaneous distance traveled S by a wheel contact point is acquired for one or more wheels 4, in particular, through direct measurement and/or in connection with measurement data read out from a WIC sensor 10-2, based on a wheel radius, wheel diameter and/or wheel circumference of a respective, associated wheel 4 of vehicle 1.

In a second substep T2-2, a Bayes filter and, in particular, a Kalman filter 20 are applied to the acquired data, namely, on one hand, to speed v and yaw rate ω of base vehicle 1, and, on the other hand, to the acquired data regarding the instantaneous distances traveled S by the wheel contact points.

From this, the position and/or orientation of base vehicle 1 in its environment is determined and/or checked for plausibility in a further substep T2-3.

The data regarding position and/or orientation of vehicle 1 in its surrounding area, which are generated in this manner with a high degree of reliability, are then taken as a basis for the evaluation of the vehicle surroundings in step T3 and, as a result, for the control of at least one vehicle unit in step T4, for example, in connection with the control of a system 40 made up of steering and brakes and/or of a drive unit 30 of vehicle 1.

These and additional features and characteristics of the present invention are elucidated further with the aid of the following explanations:

Precise Self-Locating of a Vehicle

Increased customer acceptance of automated parking systems leads to increasing usage of such systems. In this context, the performance of the overall system is evaluated by the user, and the concept of self-locating is highly important in this connection.

In the context of the automated parking, two crucial and measurable aspects are (i) the presence or absence of curbs; and (ii) the minimum size of a parking space required for a given vehicle. The influence of these aspects may be reduced, in order to improve the experience for the customer. However, more accurate locating of the vehicle during parking is an important condition for achieving such an object.

The present invention provides a new method for using information, which is derivable from ordinary ESP systems.

The action of the present invention increases the performance in automated driving and parking systems, without requiring new or additional sensors, and without the necessity of having to evaluate new and/or additional signals of ESP systems. In the case of low speeds, conventional self-locating algorithms utilize data, which may be read out of wheel impulse counters (WIC) used in the ESP system. The corresponding measured values are actually available at a known, fixed time delay, but for evaluating the vehicle speed and the yaw rate, they are acted upon by a comparatively high error due to quantization and are therefore inaccurate and consequently do not allow for precise self-locating in a vehicular application, such as in automated driving or parking.

The more accurate measured values from sensors for the circumferential wheel speeds or wheel rotational speeds (path length per unit time) are not normally used.

This may be attributed to the fact that
(A) the measured values of the sensors for the circumferential wheel speed or wheel rotational speed are not immediately available below a particular threshold value of the acquisition time; and
(B) the measured values of the sensors for the circumferential wheel speed or wheel rotational speed are only available at a variable delay. Consequently, the two are based on interrelated instances of signal preprocessing and corresponding time-out conditions.

Estimation of the Vehicle speed and Yaw Rate

In the following, it is described how accurate estimations of the vehicle speed and of the yaw rate of base vehicle 1 are generated from the four available circumferential wheel speeds $V=(V^{FrL} \ V^{FrR} \ V^{RrL} \ V^{RrR})^T \in \mathbb{R}^4$ or wheel rotational speeds.

According to the present invention, vehicle 1 may have, in general, a four-wheel steering system. This means that according to the present invention, all four wheels 4 of vehicle 1 may be steered.

In addition, in the method of the present invention and in the implementation as an algorithm, real-time implementation may be achieved, although in one embodiment of the method according to the present invention, a matrix inversion is included in the evaluation.

For example, through use of an extended information filter, the dimension of the matrix to be inverted may be reduced so much in comparison with an extended Kalman filter, that the method of the present invention and the algorithm remain real-time capable because of low computing time.

In addition, in other embodiments of the method according to the present invention, delay compensation may be initiated, so that, in particular, measured values from sensors for circumferential wheel speed or wheel rotational speed may be used.

Speed and Yaw Rate of a Vehicle from the Wheel Speeds

If yaw rate ω, that is, the change in the yaw angle of vehicle 1 over time, and the speed v of vehicle 1 are given and are represented as a state $x=(v \ \omega)^T \in \mathbb{R}^2$, then, with the aid of a suitable transformation matrix $H(u) \in \mathbb{R}^{4 \times 2}$, wheel rotational speeds V, which are also referred to as wheel speeds or circumferential wheel speeds (all of the terms are used synonymously), may be represented by the following expression:

$$V = H(u) \cdot x \quad (1.1.1)$$

$$H(u) = (\cos(\delta-\gamma) r^x \cdot \sin \delta - r^y \cdot \cos \delta) \quad (1.1.2)$$

$$u = (\delta \gamma r^x r^y)^T \quad (1.1.3)$$

Only values of measurements of the circumferential wheel speeds or wheel speeds V are given, but not state x, as such.

Therefore, it is desirable to find the best estimate of state x, which minimizes the value of an underlying norm selected as a measure of quality, thus, in this case, e.g., the minimum norm:

$$\min \| V - H(u) \cdot \hat{x} \| \quad (1.1.4)$$

This problem may be solved by determining and utilizing the pseudoinverse pinv(H(u)) associated with the matrix H(u) (instead of the inverse actually required). This is either the unique least squares solution, or it is the least squares solution of the minimum norm according to 1.1.4:

$$\hat{x} = pinv(H(u)) \cdot V \quad (1.1.5)$$

Analytical Solution of the Pseudoinverse

The elegance of the use of the pseudoinverse pinv(H(u)) according to the present invention is that the pseudoinverse pinv(H(u)) of the matrix H(u) may be calculated analytically, which means that the computational method may be implemented easily in a real-time application, for example, on the basis of the following expressions 1.1.6:

$$H = \begin{pmatrix} a & c & e & g \\ b & d & f & h \end{pmatrix}^T \in \mathbb{R}^{4\times 2} \quad (1.1.6)$$

$$pinv(H) = \frac{1}{j} \begin{pmatrix} d^2a + f^2a + h^2a - dbc - & -cad - eaf - gah + c^2b + \\ fbe - hbg & e^2b + g^2b \\ b^2c + f^2c + h^2c - bad - & -abc - efc - ghc + a^2d + \\ fde - hdg & e^2d + g^2d \\ b^2e + d^2e + h^2e - baf - & -abe - cde - ghe + a^2f + \\ dcf - hfg & c^2f + g^2f \\ b^2g + d^2g + f^2g - bah - & -abg - cdg - efg + a^2h + \\ dch - feh & c^2h + e^2h \end{pmatrix}^T$$

$$j = b(c(bc - ad) - afe - ahg + be^2 + bg^2) +$$
$$a(ad^2 + af^2 + ah^2 - bcd - bef - bgh) - cfde - decf - chdg -$$
$$dgch + c^2f^2 + c^2h^2 + d^2e^2 + d^2g^2 - fgeh - ehfg + e^2h^2 + f^2g^2$$

Delay Compensation for Vehicle Speed and Yaw Rate

At a time K=k·Ts, a direct speed measurement having the value $V_k$ is not available due to the time delay of the signals. Assuming that measurements $V_l$ at time L=l·Ts with k>l, the corresponding states x may be determined, for example, according to (1.1.7):

$$\hat{x}_l = pinv(H(u_l)) \cdot V_l \quad (1.1.7)$$

An option for determining values at the later time K=k·$T_s$ may be, for example, to integrate the changes in state x with respect to time, that is, from time L to time K, for example, according to expression (1.1.8):

$$\hat{x}(K) = \hat{x}(L) + \int_{t=L}^{K} \frac{d\hat{x}(t)}{dt} dt \quad (1.1.8)$$

The derivative $\dot{x}$ of state x with respect to time may be ascertained from acceleration measurements $A \in \mathbb{R}$ and a single-track model, which supplies the distance $R \in \mathbb{R}$ from the center of rotation. This yields the expression (1.1.9):

$$\frac{dx}{dt} = \dot{x} = \begin{pmatrix} \dot{\omega} \\ \dot{v} \end{pmatrix} = \begin{pmatrix} \frac{d}{dt}\left(\frac{v}{R}\right) \\ a \end{pmatrix} \approx \begin{pmatrix} \frac{A}{R} \\ A \end{pmatrix} \quad (1.1.9)$$

Consequently, a representation of the state $\hat{x}$ at time K results in accordance with expression (1.1.10):

$$\hat{x}_k = \begin{pmatrix} \hat{V}_k \\ \hat{\Omega}_k \end{pmatrix} = \hat{x}_l + \sum_{j=l}^{k-1} \begin{pmatrix} A_j \\ R_j \\ A_j \end{pmatrix} \cdot \frac{T_s}{k-l-1} \quad (1.1.10)$$

To calculate the values for such a representation according to expression (1.1.10), measured values of acceleration A and of the center of rotation, that is, of the corresponding distance R of the center of rotation with regard to the single-track model, must be available and known without significant delay. In the case of use of measurements from an ESP system with regard to the acceleration, an offset estimation must be implemented.

Application of the Concept of Measurement and Simulation

Figure 4:
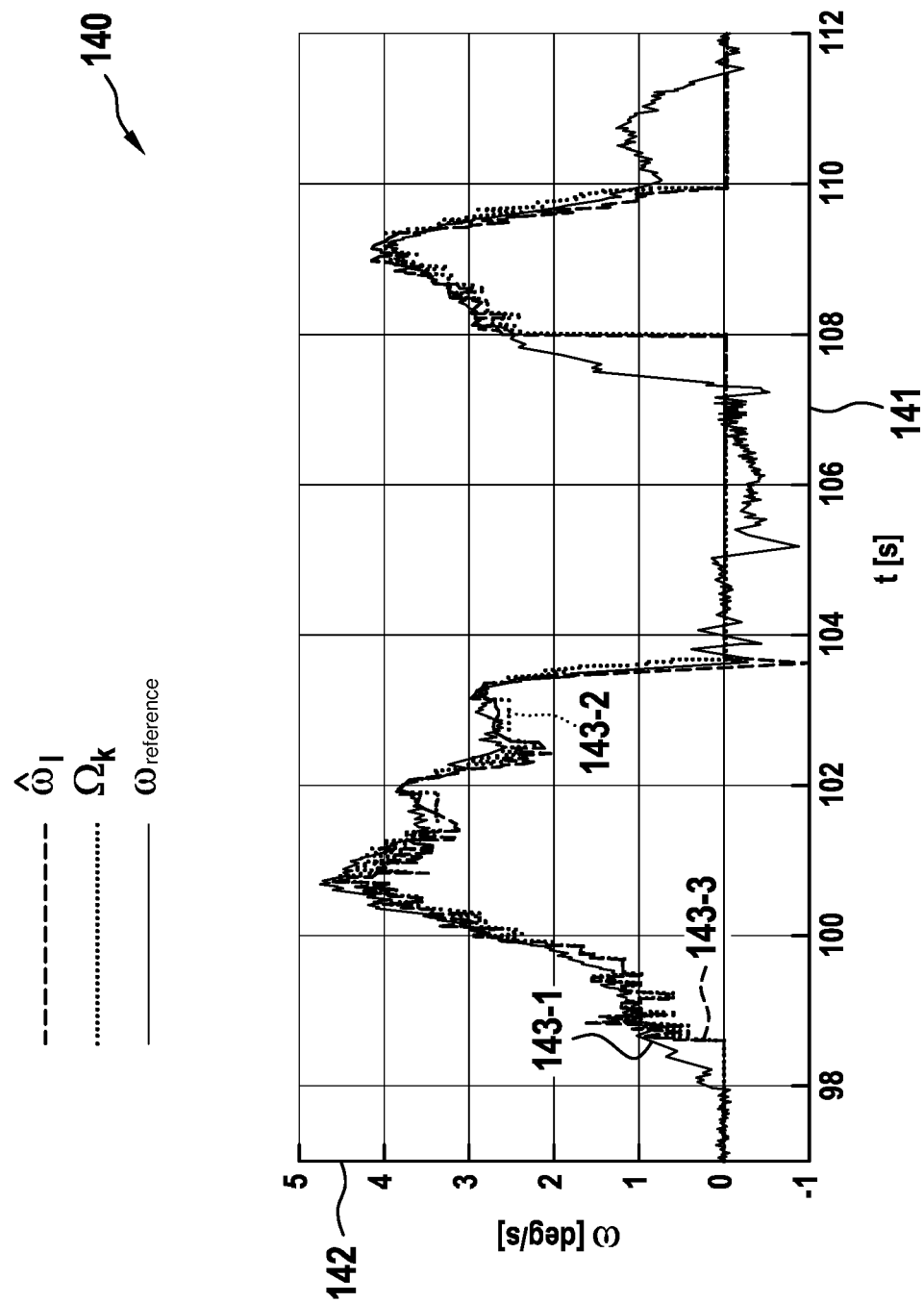
FIGS. 4 through 7 show graphs for explaining the mode of operation of specific embodiments of the driving assistance system and driving assistance method of the present invention.
Figure 5:
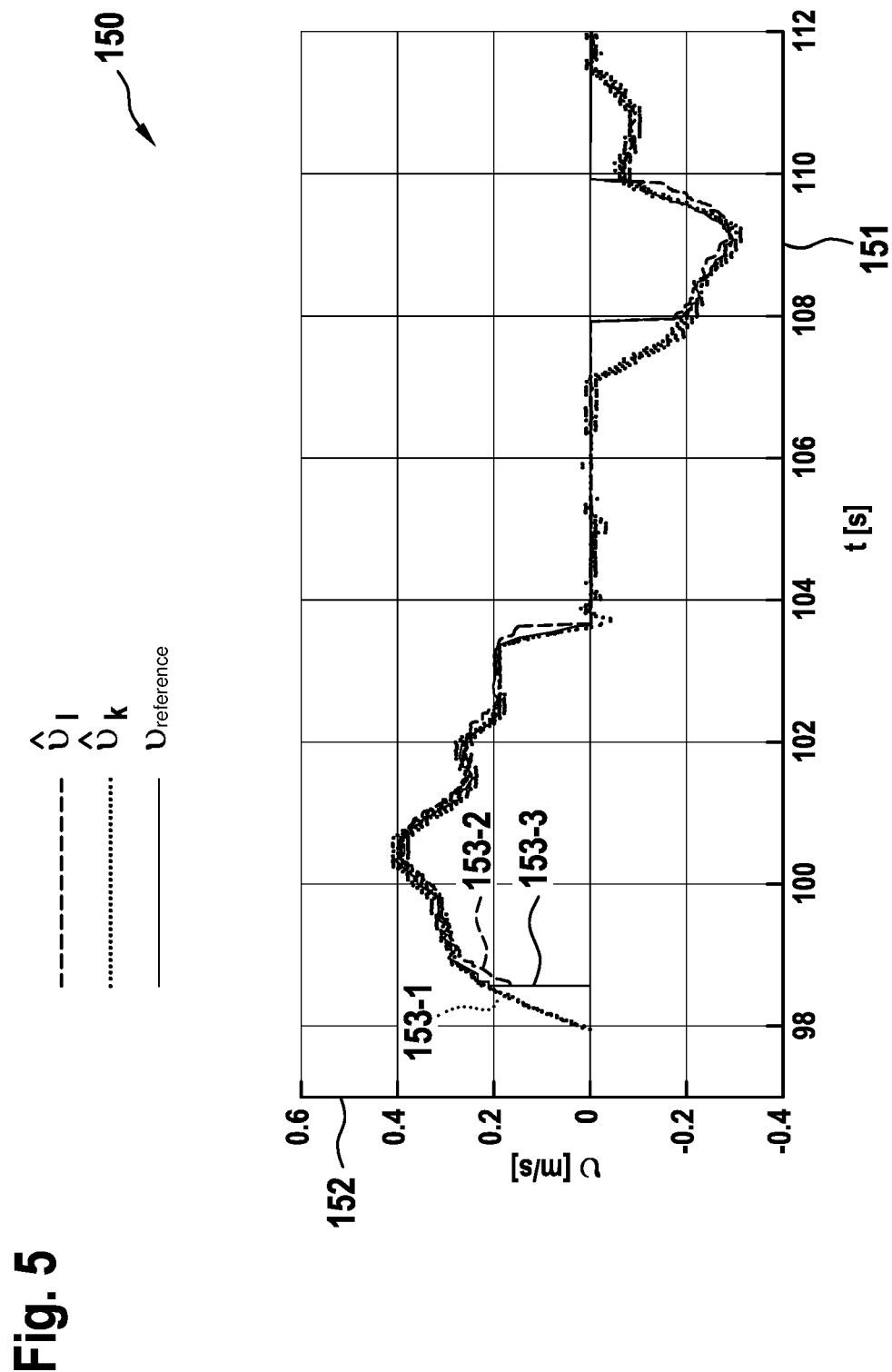

In FIGS. 4 and 5, traces 143-1 to 153-3 of different signals for the yaw rate and speed as a function of time t, namely, as part of a scenario of parallel parking, are represented in the form of graphs 140, 150.

Solid traces 143-1, 153-1 relate to a reference system, which is utilized for representing the actual conditions. The measurements in relation to the reference system are recorded by an inertial measurement unit, which is coupled to a DGPS system, in order to compensate for sensor errors, such as offset, drift and gain.

The values calculated from the circumferential wheel speeds or wheel speeds are represented as derived values or estimates, in the form of dashed lines, in traces 143-2, 153-2. They have a time delay and are determined according to expression (1.1.7).

The measurements compensated for in the time delay by acceleration measurements are represented pointwise in traces 143-3, 153-3. The corresponding values are generated in accordance with expression (1.1.10).

In graphs 140 and 150 of FIGS. 4 and 5, the time is plotted on abscissas 141 and 151. The yaw rate and the vehicle speed are plotted on ordinates 142 and 152, respectively.

Merging Plan

Using a Bayes filter and, in particular, an extended Kalman filter, together with the above-described pseudoinverse for the actual transformation matrix H(u), measurements of values of circumferential wheel speed V and values of a distance traveled by wheel contact points or centers of tire contact S may be merged or connected to each other.

To that end, a system function $f \in \mathbb{R}^3$ and a measuring function $h \in \mathbb{R}^9$ are introduced. The system function describes how vehicle speed $v \in \mathbb{R}$, vehicle yaw rate $\omega \in \mathbb{R}$ and distances traveled $s \in \mathbb{R}^4$ by the centers of tire contact develop with time. A representation according to expression (1.2.1) results:

$$x_{k+1} = \begin{pmatrix} v_{k+1} \\ \omega_{k+1} \\ s_{k+1} \end{pmatrix} = f(x_k, u_k) =$$

$$\begin{pmatrix} v_k + A_k \cdot T_s \\ \omega_k \\ s_k + [(v_k + a_k \cdot T_s) \cdot \cos(\delta_k - \gamma_k) + \omega_k \cdot (r^x \cdot \sin \delta_k - r^y \cdot \cos \delta_k)] \cdot T_s \end{pmatrix} \quad (1.2.1)$$

In this representation, $T_s$ is the sampling time. Variables $r^x$ and $r^y$ denote the contact point vectors. Variable $\delta$ denotes the vector of the individual wheel rotational angles. The component representations (1.2.2) for these variables are as follows:

$$s = (s^{FrL}, s^{FrR}, s^{RrL}, s^{RrR})^T$$

$$r^x = (r^{x,FrL}, r^{x,FrR}, r^{x,RrL}, r^{x,RrR})^T$$

$$r^y = (r^{y,FrL}, r^{y,FrR}, r^{y,RrL}, r^{y,RrR})^T$$

$$\delta = (\delta^{FrL}, \delta^{FrR}, \delta^{RrL}, \delta^{RrR})^T \quad (1.2.2)$$

Measuring function h describes how the values of measurements z may be determined as a function of system states x and input values u. The following component representation (1.2.3) is yielded:

$$z_k = \begin{pmatrix} \hat{V}_k \\ \hat{\Omega}_k \\ S_k \end{pmatrix} = h(x_k, u_k) = \begin{pmatrix} v_k \\ \omega_k \\ s_k + [(v_k + a_k \cdot T_s) \cdot \cos(\delta_k - \gamma_k) + \omega_k \cdot (r^x \cdot \sin \delta_k - r^y \cdot \cos \delta_k)] \cdot T_s \end{pmatrix} \quad (1.2.3)$$

The following variables occur in this representation in accordance with component representation (1.2.4):

$$S = (S^{FrL} S^{FrR} S^{RrL} S^{RrR})^T \quad (1.2.4)$$

In this context, variable $S^i$ denotes the distance traveled by the corresponding wheel contact point; the distance traveled being able to be ascertained on the basis of the corresponding circumference of associated wheel 4 and the value read out of the WIC sensor. Variables $\hat{V}_k$ and $\hat{\Omega}_k$ denote the values or estimates of values of the speed and the yaw rate, respectively, using the above-mentioned formulation.

$$\hat{x}_{k|k-1} = f(\hat{x}_{k-1|k-1})$$

prediction of the state: $P_{k|k-1} = F_k \cdot P_{k-1|k-1} \cdot F + Q_k$ $$\hat{z}_k = h(\hat{x}_{k|k-1})$$

$$S_k = H_k \cdot P_{k|k-1} \cdot H_k^T + R_k$$

prediction of the measurement: $\Psi_k = P_{k|k-1} \cdot H_k^T$ $$\hat{x}_{k|k} = \hat{x}_{k|k-1} + K_k \cdot (z_k - \hat{z}_k)$$

$$P_{k|k} = P_{k|k-1} - K_k \cdot H_k^T S_k^{-1} \quad (1.2.5)$$

updating, using measurement: $K_k = \Psi_k \cdot S_k^{-1}$

In the relations according to (1.2.5), P denotes the system covariance, S denotes the innovation covariance, K denotes the Kalman gain, Q denotes the system noise, and R denotes the measuring noise. T denotes an auxiliary variable.

Matrices F and H are defined in relation to expressions (1.2.6) and (1.2.7).

In one preferred specific embodiment, a Bayes Filter and, in particular, an expanded Kalman filter are used in accordance with the above scheme (1.2.5), in order to determine or estimate the values of v and ω. In this context, the complete state, which includes S, is generally ascertained.

In this instance, however, S is integrated only from v and ω. In this manner, the position of vehicle 1, which may be calculated from v and ω, may be ascertained outside of the filter. The representation according to expression (1.2.6) results for this:

$$F = \frac{\partial f}{\partial x} \quad (1.2.6)$$

$$H \stackrel{def}{=} \begin{pmatrix} 1 & 0 & 0 & 0 & 0^{1 \times 4} \\ 0 & 1 & 0 & 0 & 0^{1 \times 4} \\ 0^{4 \times 1} & 0^{4 \times 1} & T_s \cdot \cos(\delta - \gamma) & T_s \cdot (r^x \cdot \sin \delta - r^y \cdot \cos \delta) & 0^{4 \times 4} \end{pmatrix}$$

In this context, it should be noted that $$H \neq \frac{\partial h}{\partial x},$$

since the lower right (4×4) submatrix of H is not an identity matrix. The following is yielded:

$$\frac{\partial h}{\partial x} = \begin{pmatrix} 1 & 0 & 0 & 0 & 0^{1 \times 4} \\ 0 & 1 & 0 & 0 & 0^{1 \times 4} \\ 0^{4 \times 1} & 0^{4 \times 1} & T_s \cdot \cos(\delta - \gamma) & T_s \cdot (r^x \cdot \sin \delta - r^y \cdot \cos \delta) & 1^{4 \times 4} \end{pmatrix} \quad (1.2.7)$$

In this instance, s may not be influenced directly by a measurement of S. Nevertheless, s is corrected indirectly via the states or values of v and ω.

In this manner, the position of vehicle 1 may be determined or estimated, namely, from the states or values of v and ω, and via the distance traveled, namely, in accordance with and in agreement with the path of the contact points.

Simulation Results

Figure 6:
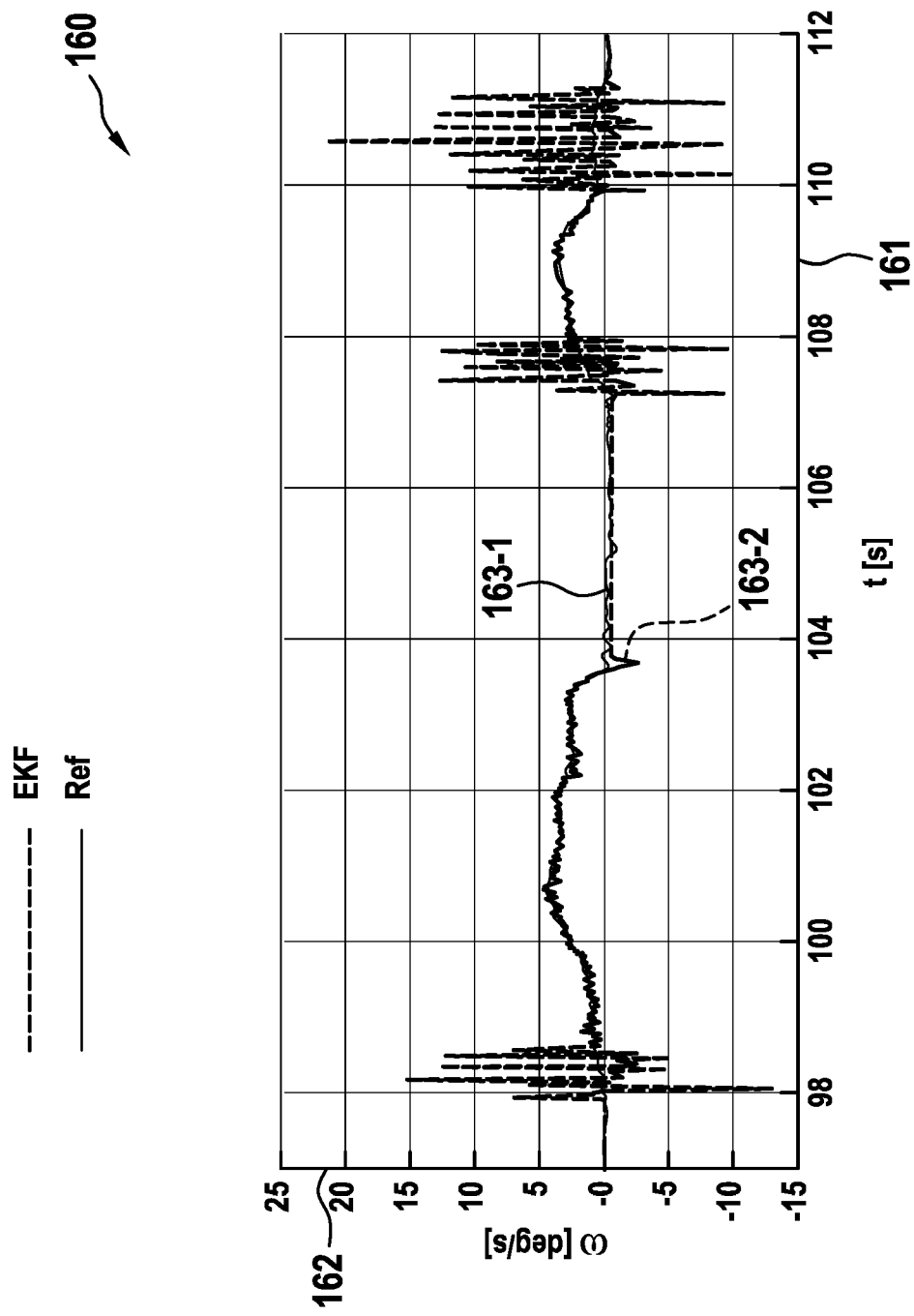
Figure 7:
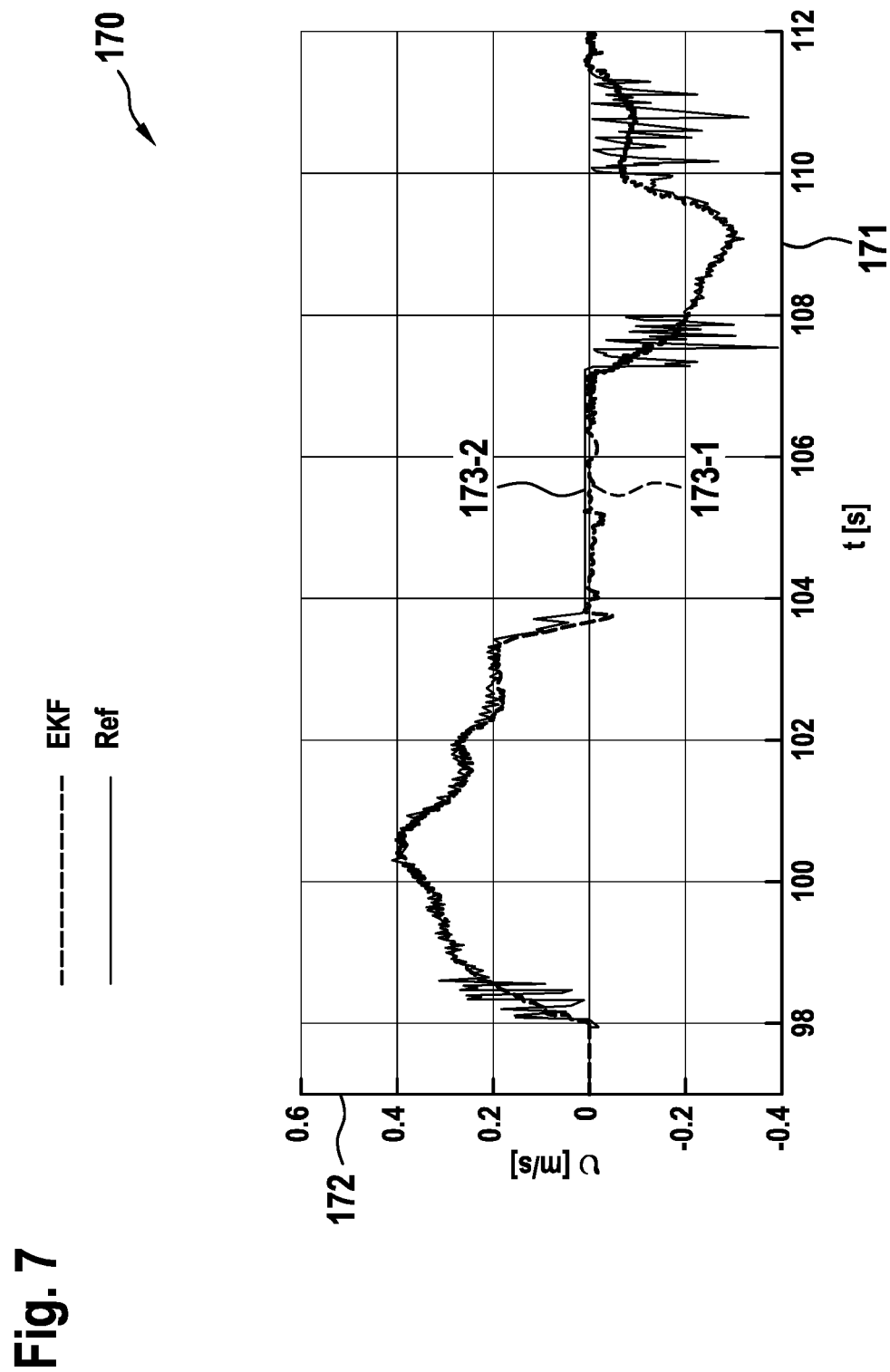

In FIGS. 6 and 7, simulation results for the same sequence as described above are represented in graphs 160 and 170.

In graphs 160 and 170 of FIGS. 6 and 7, the time is plotted on abscissas 161 and 171. The yaw rate and the vehicle speed are plotted on ordinates 162 and 172, respectively.

Solid traces 163-1 and 173-1 relate again to reference measurements, the traces 163-2 and 173-2 represented as dashed lines relate to values, which are generated, using a Bayes Filter and, in particular, an extended Kalman filter 20 (EKF).

It is apparent that, in particular, during the time in which a pseudo-measurement of speed v and yaw rate ω is available, the final determination or estimate utilizing the Bayes filter and, in particular, the extended Kalman filter 20, is highly effective. The accuracy of the angular rate may be improved further through pseudo-measurements, using a single-track model, or simply by measurements of the yaw rate.

What is claimed is:

1. A driving assistance method for a vehicle, comprising the following steps:
    for each of at least one respective wheel, determining a respective instantaneous circumferential wheel speed from signals of a respective rotational speed sensor of the respective wheel;
    ascertaining, based on the at least one respective instantaneous circumferential wheel speed, both an instantaneous speed of the vehicle and an instantaneous yaw rate of the vehicle;
    for the each of the at least one respective wheel, determining a distance traveled by a wheel contact point of the respective wheel; and
    applying the determined distance traveled by the wheel contact point, the ascertained instantaneous speed of the vehicle, and the ascertained instantaneous yaw rate of the vehicle as three parallel input parameters to a filter that operates on the input parameters to self-locate the vehicle based on the input parameters while the vehicle is traveling at a speed of less than 5 kilometers per hour.

2. The driving assistance method as recited in claim 1, wherein a time delay of the signals is compensated for by temporally extrapolating measured values at an earlier measuring time to a current evaluation time, by integrating with respect to time, from the earlier measuring time to the current evaluation time, based on one or more measured values of an instantaneous acceleration of the vehicle and/or based on a single-track model of the vehicle.

3. The driving assistance method as recited in claim 1, wherein during the ascertaining of the instantaneous speed of the vehicle and the instantaneous yaw rate of the vehicle, an operation of Moore pseudoinversion is provided and applied to the at least one determined respective instantaneous circumferential wheel speed.

4. The driving assistance method as recited in claim 1, wherein a Moore pseudoinverse of a transformation matrix between a state of the vehicle and a vector formed by the at least one determined respective instantaneous circumferential wheel speed is generated and applied to the vector in order to provide the instantaneous speed of the vehicle and the instantaneous yaw rate of the vehicle.

5. The driving assistance method as recited in claim 1, wherein, for the each of the at least one respective wheel, the determination of the distance traveled by the wheel contact point is made using a combination of (a) output of a respective wheel impulse counter and (b) a predefined measure of a length of a respective circumference of the respective wheel.

6. The driving assistance method as recited in claim 5, wherein the filter includes a Bayes filter and an extended Kalman filter.

7. A control unit for a driving assistance system of a vehicle, the control unit configured to:
for each of at least one respective wheel, determine a respective instantaneous circumferential wheel speed from signals of a respective rotational speed sensor of the respective wheel;
ascertain, based on the at least one respective instantaneous circumferential wheel speed, both an instantaneous speed of the vehicle and an instantaneous yaw rate of the vehicle;
for the each of the at least one respective wheel, determine a distance traveled by a wheel contact point of the respective wheel; and
apply the determined distance traveled by the wheel contact point, the ascertained instantaneous speed of the vehicle and the ascertained instantaneous yaw rate of the vehicle as three parallel input parameters to a filter that operates on the input parameters to self-locate the vehicle based on the input parameters while the vehicle is traveling at a speed of less than 5 kilometers per hour.

8. A driving assistance system for a vehicle, comprising:
a control unit configured to:
for each of at least one respective wheel, determine a respective instantaneous circumferential wheel speed from signals of a respective rotational speed sensor of the respective wheel;
ascertain, based on the at least one respective instantaneous circumferential wheel speed, both an instantaneous speed of the vehicle and an instantaneous yaw rate of the vehicle;
for the each of the at least one respective wheel, determining a distance traveled by a wheel contact point of the respective wheel; and
apply the determined distance traveled by the wheel contact point, the ascertained instantaneous speed of the vehicle and the ascertained instantaneous yaw rate of the vehicle as three parallel input parameters to a filter that operates on the input parameters to self-locate the vehicle based on the input parameters while the vehicle is traveling at a speed of less than 5 kilometers per hour.

9. A vehicle, comprising:
a driving assistance system for the vehicle, the driving assistance system comprising a control unit configured to:
for each of at least one respective wheel, determine ing a respective instantaneous circumferential wheel speed from signals of a respective rotational speed sensor of the respective wheel;
ascertain, based on the at least one respective instantaneous circumferential wheel speed, both an instantaneous speed of the vehicle and an instantaneous yaw rate of the vehicle;
for the each of the at least one respective wheel, determining a distance traveled by a wheel contact point of the respective wheel; and
apply the determined distance traveled by the wheel contact point, the ascertained instantaneous speed of the vehicle and the ascertained instantaneous yaw rate of the vehicle as three parallel input parameters to a filter that operates on the input parameters to self-locate the vehicle based on the input parameters while the vehicle is traveling at a speed of less than 5 kilometers per hour.

\* \* \* \* \*